United States Patent
Di Blas et al.

(10) Patent No.: US 10,489,493 B2
(45) Date of Patent: Nov. 26, 2019

(54) METADATA REUSE FOR VALIDATION AGAINST DECENTRALIZED SCHEMAS

(75) Inventors: Andrea Di Blas, San Francisco, CA (US); Ravi Murthy, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 615 days.

(21) Appl. No.: 13/615,213

(22) Filed: Sep. 13, 2012

(65) Prior Publication Data

US 2014/0075285 A1    Mar. 13, 2014

(51) Int. Cl.
G06F 17/22    (2006.01)
G06F 17/27    (2006.01)
G06F 17/21    (2006.01)

(52) U.S. Cl.
CPC ........ G06F 17/2247 (2013.01); G06F 17/218 (2013.01); G06F 17/2725 (2013.01)

(58) Field of Classification Search
CPC .............. G06F 17/2247; G06F 17/218; G06F 17/2725; G06F 17/2275
USPC ................................................. 715/234, 200
See application file for complete search history.

(56) References Cited

U.S. PATENT DOCUMENTS

| | | | |
|---|---|---|---|
| 5,434,962 A | 7/1995 | Kyojima et al. |
| 6,138,120 A | 10/2000 | Gongwer et al. |
| 6,622,139 B1 | 9/2003 | Nakayama et al. |
| 6,826,726 B2 | 11/2004 | Hsing et al. |
| 7,051,016 B2 | 5/2006 | Winkler |
| 7,143,344 B2 | 11/2006 | Parker et al. |
| 7,293,038 B2 | 11/2007 | Blevins et al. |
| 7,480,859 B2 | 1/2009 | Mani et al. |
| 7,493,305 B2 | 2/2009 | Thusoo et al. |
| 7,512,878 B2 | 3/2009 | Shur et al. |
| 7,614,052 B2 | 11/2009 | Wei |
| 7,707,492 B2 | 4/2010 | Zaharkin |
| 7,765,467 B2 | 7/2010 | Malek et al. |
| 7,797,622 B2 | 9/2010 | Dejean et al. |
| 7,810,024 B1 | 10/2010 | Goldman |
| 7,831,620 B2 | 11/2010 | Barsness et al. |
| 7,882,149 B2 | 2/2011 | Foster et al. |
| 7,904,326 B2 | 3/2011 | Gharavy |

(Continued)

OTHER PUBLICATIONS

Dekeyser Stjin et al., "Conflict Scheduling of Transactions on XML Documents", dated 2004, 10 pages.

(Continued)

*Primary Examiner* — Chau T Nguyen
(74) *Attorney, Agent, or Firm* — Hickman Palermo Becker Bingham LLP

(57) ABSTRACT

A validation procedure employs metadata reuse using composite path signatures to make a metadata reuse determination. The procedure is performed as part of validating a set of data objects. Validating an initial subset of data objects generates N different sets of object-specific metadata, each set of which is associated with a different composite path signature. When subsequently validating another data object, a composite path signature is generated for the data object and compared with the composite path signatures of the N different sets of object-specific metadata. If a match is found, then the object-specific metadata of the matching composite path signature is reused for the data object. The object-specific metadata is remapped to an in-memory representation of the data object.

20 Claims, 11 Drawing Sheets

(56) References Cited

U.S. PATENT DOCUMENTS

| | | | |
|---|---|---|---|
| 7,913,172 | B2 | 3/2011 | Rjaibi et al. |
| 7,958,077 | B2 | 6/2011 | Vescovi et al. |
| 7,974,966 | B2 | 7/2011 | Robie |
| 8,117,533 | B2 | 2/2012 | Adler et al. |
| 8,176,563 | B2 | 5/2012 | Redlich et al. |
| 8,356,079 | B2 | 1/2013 | Basu et al. |
| 8,515,988 | B2 | 8/2013 | Jones et al. |
| 8,560,564 | B1 | 10/2013 | Hoelzle et al. |
| 8,566,096 | B2 | 10/2013 | Bangalore et al. |
| 8,661,332 | B2 | 2/2014 | Dunietz et al. |
| 8,667,015 | B2 * | 3/2014 | Jiao et al. .................. 707/780 |
| 8,850,309 | B2 | 9/2014 | Fablet et al. |
| 2002/0010715 | A1 | 1/2002 | Chinn et al. |
| 2002/0147652 | A1 | 10/2002 | Gheith et al. |
| 2002/0147747 | A1 | 10/2002 | Zaharkin |
| 2003/0028557 | A1 | 2/2003 | Walker et al. |
| 2003/0074636 | A1 | 4/2003 | Manepalli |
| 2004/0107402 | A1 * | 6/2004 | Seyrat et al. .............. 715/513 |
| 2005/0076030 | A1 | 4/2005 | Hada et al. |
| 2005/0144166 | A1 * | 6/2005 | Chapus et al. ................ 707/6 |
| 2005/0203957 | A1 | 9/2005 | Wang et al. |
| 2005/0246716 | A1 | 11/2005 | Smith et al. |
| 2006/0004729 | A1 | 1/2006 | Zhilyaev et al. |
| 2006/0167905 | A1 | 7/2006 | Liu et al. |
| 2007/0016605 | A1 * | 1/2007 | Murthy et al. ............. 707/102 |
| 2007/0078537 | A1 * | 4/2007 | Chand et al. ................. 700/83 |
| 2007/0250527 | A1 | 10/2007 | Murthy et al. |
| 2008/0059505 | A1 | 3/2008 | Kalia et al. |
| 2009/0019358 | A1 | 1/2009 | Blake et al. |
| 2009/0119316 | A1 | 5/2009 | Bakker et al. |
| 2009/0129396 | A1 | 5/2009 | Bakker et al. |
| 2009/0248431 | A1 | 10/2009 | Schoknecht et al. |
| 2010/0030752 | A1 | 2/2010 | Goldentouch |
| 2010/0049727 | A1 | 2/2010 | Balegar et al. |
| 2010/0070500 | A1 | 3/2010 | Cui et al. |
| 2011/0004820 | A1 | 1/2011 | Kloiber et al. |
| 2011/0145783 | A1 | 6/2011 | Seshan et al. |
| 2011/0173528 | A1 | 7/2011 | Zunger |
| 2011/0213783 | A1 | 9/2011 | Keith |
| 2011/0276360 | A1 | 11/2011 | Barth et al. |
| 2011/0289118 | A1 | 11/2011 | Chen et al. |
| 2012/0323919 | A1 | 12/2012 | Alba et al. |
| 2013/0007068 | A1 | 1/2013 | Pitschke |
| 2013/0007070 | A1 | 1/2013 | Pitschke |
| 2013/0086462 | A1 | 4/2013 | De Cerqueira Gatti et al. |
| 2013/0219017 | A1 | 8/2013 | Bakker et al. |
| 2013/0346438 | A1 | 12/2013 | Sedlar et al. |
| 2013/0346444 | A1 * | 12/2013 | Makkar et al. ............. 707/770 |

OTHER PUBLICATIONS

Oasis, "Oasis Content Assembly Mechanism Specification Version 1.1", Committee Specification Draft 02, dated Feb. 26, 2007, 62 pages.

Kathuria et al., IBM, XML Validation Framework Using Oasis Cam, dated May 11, 2010, 16 pages.

Carey et al., IBM, "Meet Cam: A New XML Validation Technology" dated Sep. 22, 2009, 10 pages.

Cam Content Assembly Mechanism, "Executive Overview", Oasis Business Transaction Information Management, 8 pages, dated Jul. 6, 2011.

U.S. Appl. No. 13/923,033, filed Jun. 20, 2013, Office Action, dated May 5, 2014.

U.S. Appl. No. 13/221,832, filed Aug. 30, 2011, Notice of Allowance, dated Jun. 2, 2014.

Chamberlin et al., "XQueryP: An XML Application Development Language", dated Dec. 31, 2006, 14 pages.

Christian Tarnutzer, "Streaming XQuery P", Databases and Information Systems Group, Department of Computer Science ETH Zurich, dated Dec. 12, 2008, 114 pages.

Chamberlin et al., "XQueryP: Programming with XQuery", XIME-P 2006: 3$^{rd}$ International Workshop on XQuery Implementation, dated Jun. 30, 2006, 7 pages.

U.S. Appl. No. 13/221,832, filed Aug. 30, 2011, Final Office Action, dated Jul. 17, 2013.

Zhao et al., A Unifying Approach to Validatig Specification-Oriented XML Constraints, IEEE 2011, 8 pages.

Lee et al., A Path Clustering based on Structural Similarity in XML, Google 2000, 4 pages.

U.S. Appl. No. 12/782,591, filed May 18, 2010, Notice of Allowance, dated Jan. 17, 2013.

U.S. Appl. No. 13/221,832, filed Aug. 30, 2011 Office Aciton, dated Dec. 3, 2013.

U.S. Appl. No. 13/923,033, filed Jun. 20, 2013, Notice of Allowance, dated Aug. 18, 2014.

Simov et al., Constraints for Corpora Development and Validation, Google, dated 2003, 8 pages.

Gasch et al., Memasysco: XML Schema Based Metadata Management System for Speech Corpora, Google dated 2008, 6 pages.

Bouottaya et al., Schema Matching for Transforming Structured Documents, AMC, 2005, 10 pages.

U.S. Appl. No. 13/221,832, filed Aug. 30, 2011, Office Action, dated Dec. 5, 2012.

U.S. Appl. No. 13/221,832, filed Aug. 30, 2011, Notice of Allowance, dated Nov. 17, 2014.

* cited by examiner

Node-TQP Table 702

| Node Pointer | Path Signature |
|---|---|
| node1.1 | /R |
| node1.2 | /R/A |
| node1.3 | /R/A/C |
| node1.4 | /R/A/D |
| node1.5 | /R/A[CM] |
| node1.6 | /R/A[CM]/C |
| node1.7 | /R/A[CM]/C |
| node1.8 | /R/B |
| node1.9 | /R/B/C |
| node1.10 | /R/B/C |

TQP Hash Table 703

| Path Signature | TQP Pointer |
|---|---|
| /R | tqp1 |
| /R/A | tqp2 |
| /R/A/C | tqp3 |
| /R/A/D | tqp4 |
| /R/A[CM] | tqp5 |
| /R/A[CM]/C | tqp6 |
| /R/B | tqp7 |
| /R/B/C | tqp8 |

FIG. 7

| Node-TQP Table 802 | |
|---|---|
| Node Pointer | Path Signature |
| node2.1 | /R |
| node2.2 | /R/A |
| node2.3 | /R/A/C |
| node2.4 | /R/A/D |
| node2.5 | /R/A/C/M |
| node2.6 | /R/A/C/M/C |
| node2.7 | /R/B |
| node2.8 | /R/B/C |
| node2.9 | /R/B/C |
| node2.10 | /R/A |
| node2.11 | /R/A/C |
| node2.12 | /R/A/D |

| TQP Hash Table 703 | |
|---|---|
| Path Signature | TQP Pointer |
| /R | tqp1 |
| /R/A | tqp2 |
| /R/A/C | tqp3 |
| /R/A/D | tqp4 |
| /R/A/C/M | tqp5 |
| /R/A/C/M/C | tqp6 |
| /R/B | tqp7 |
| /R/B/C | tqp8 |

METADATA REUSE FOR VALIDATION AGAINST DECENTRALIZED SCHEMAS

CROSS-REFERENCE TO RELATED APPLICATIONS; BENEFIT CLAIM

This application is related to U.S. patent application Ser. No. 13/221,832, entitled VALIDATION BASED ON DECENTRALIZED SCHEMAS, filed on Aug. 30, 2011, by Andrea Di Blas, et al., incorporated herein by reference and referred to hereafter as the Validation Application.

This application is related to U.S. patent application Ser. No. 12/782,591, entitled TYPE SYSTEM FOR BUILDING EXTENSIBLE BUSINESS APPLICATIONS, filed on May 18, 2010 by Eric Sedlar, et al., incorporated herein by reference.

FIELD OF THE INVENTION

The present invention relates to validating data objects marked by a mark-up language, such as XML.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The use of hierarchical mark-up languages for structuring and describing data is finding wide acceptance in the computer industry. An example of a mark-up language is (extensible Mark-up Language) XML.

Data structured using a hierarchical mark-up language is composed of nodes. Nodes are usually delimited by a pair of corresponding start and end tags, which not only delimit the node, but also specify the name of the node. For example, in the following structured data fragment,

<A><B>5</B><D>10</D></A> the start tag <A> and the end tag </A> delimit a node having a name a.

The data between the corresponding tags is referred to as the node's content. A node's content can either be a scalar value (e.g. integer, text string), or one or more other nodes. A node that contains only a scalar value is referred to herein as a scalar node. A node that contains another node is referred to herein as a structured node. The contained nodes are referred to herein as descendant nodes.

In addition to containing one or more nodes, a structured node's content may also include a scalar value. Such content in a node is referred to herein as mixed content.

A structured node thus forms a hierarchy of nodes with multiple levels, the structured node being at the top level. A node at each level is linked to one or more nodes at a different level. Each node at a level below the top level is a child node of a parent node at the level above the child node. Nodes having the same parent are sibling nodes. A parent node may have multiple child nodes. A node that has no parent node linked to it is a root node, and a node that has no child nodes linked to it is a leaf node. For example, in structured node A, node A is the root node at the top level. Nodes B and D are descendant and child nodes of A, and, with respect to each other, nodes B and D are sibling nodes. Nodes B and D are also leaf nodes.

Schemas

A "hierarchical data object" is an arbitrary sequence of one or more structured nodes. Hierarchical data objects may be stored in various formats. For example, a hierarchical data object may be stored as a text file, or a hierarchical data object may be stored in an XML database in a Large Object (LOB) column of a row, or as a web page accessible as a resource on the Internet. A hierarchical data object is also referred to herein as a "data object".

A schema constrains structure and content of data objects. Generally speaking, a schema is a set of rules for structure and constraints for units of data. The term schema is used herein both to refer to a single schema, that is, rules for a single type of unit of data, or to a collection of schemas, each defining a different type of unit of data. For example, the term schema may refer to multiple document schemas or to a single document schema, or a structure defined by document schema.

Schemas and the rules therein can be expressed using schema declarations. Schema declarations are expressions that, according to a schema standard and/or language, define a schema rule.

A schema standard used for XML documents is XML Schema. XML Schema provides for a type of schema referred to herein as a document-centralized schema. In a document-centralized schema, a document schema is defined by a schema declaration that expressly declares to be a document schema.

In a decentralized schema, a corpus of elements declares schemas for a collection of data objects and nodes in the collection. As the term is used herein, an "element" associates a name with a set of rules declared for the content of the nodes having that name. A node in a data object having a name of an element is referred to as an instance of the element.

This definition of "element" should not be confused with the definition conventionally ascribed to "element" by the XML community, which is that an element is a node in a document.

Validation

Validation refers to the process of determining whether a data object, or part thereof, conforms to a schema. Validating a data object requires a determination of what rules are needed to validate the data object. The set of rules needed to validate a data object is referred to herein as the schema rule set. The operation of determining the schema rule set is referred to herein as schema rules collection. Schema rules collection can be a computational complex task and, therefore, improving the efficiency with which this task is performed is important.

For document-centralized schemas, schema rules collection can be made more efficient by performing schema rules collection in advance of validating documents against the schema rules. For a given document schema, a schema rule set may be generated and subsequently applied to validate documents purporting to belong to that document schema.

However, it is not feasible to perform schema rules collection in advance for a decentralized schema. Unlike a document-centralized schema, a schema rule set for a data object of a decentralized schema can only be determined by examining the data object, for reasons discussed in the Validation Application. Even though data objects may be instances of the same element, the schema rule set needed to validate each may differ.

Based on the foregoing, there is a need for techniques and mechanisms for efficiently generating schema rules sets for data objects of decentralized schemas.

BRIEF DESCRIPTION OF THE DRAWINGS

In the drawings:

FIG. 7 is a diagram depicting mapping structures used to map an in-memory data object to metadata according to an embodiment of the present invention.

FIG. 8 is a diagram depicting mapping structures used to map an in-memory data object to metadata according to an embodiment of the present invention.

DETAILED DESCRIPTION

Figure 1:
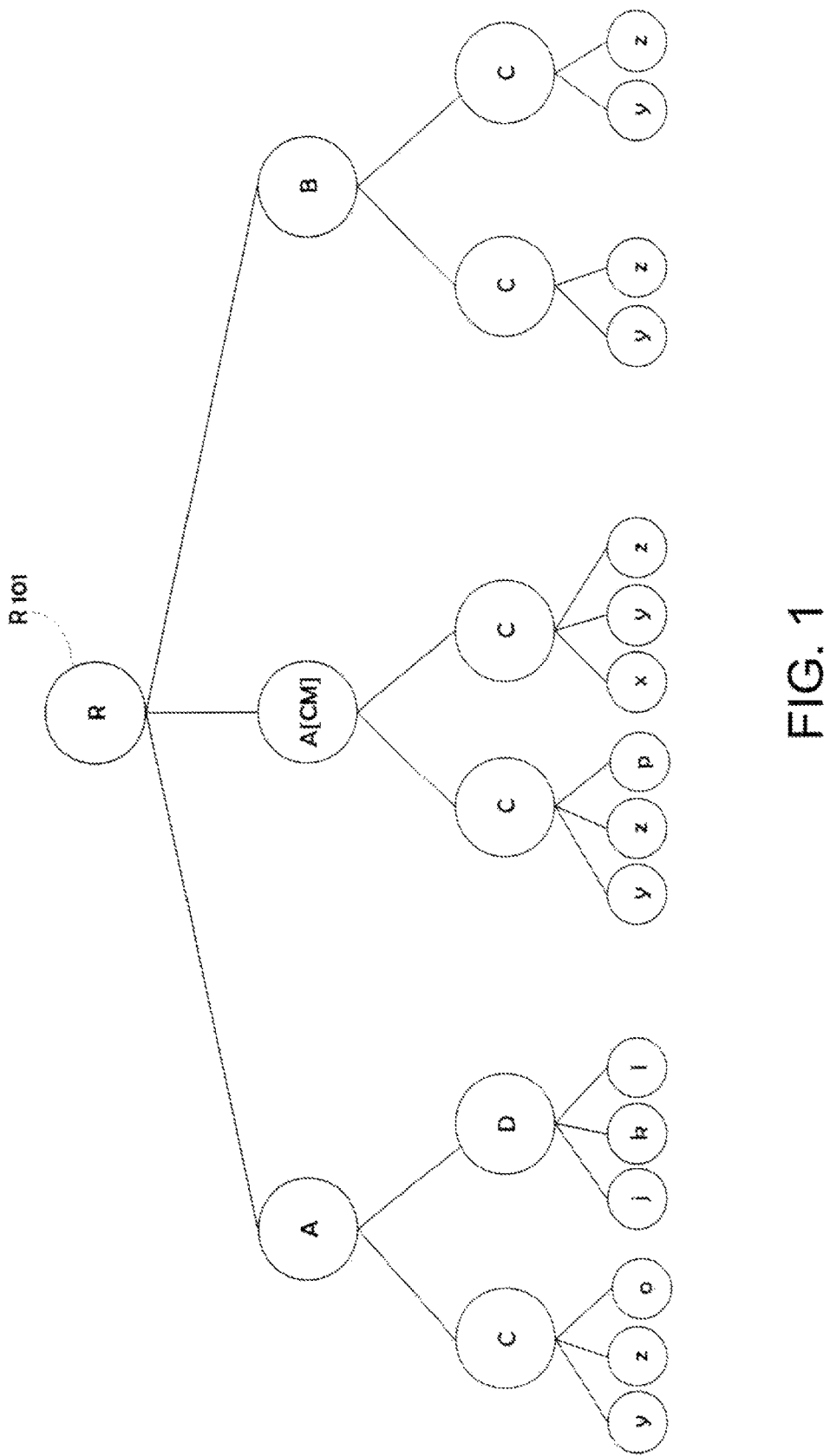
FIG. 1 is a diagram depicting a data object containing instances of typed elements according to an embodiment of the present invention.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In a decentralized schema, validating a data object entails generating metadata needed to validate the data object. The assemblage of metadata generated during validation to validate a specific object is referred to herein as an "object-specific metadata". Object-specific metadata for an object includes metadata representing the schema rule set needed to validate the object, as well as other forms of metadata and supporting data structures. Generating the object-specific metadata can comprise a substantial portion of computing processing incurred to validate the data object.

A scenario for validating data objects is to validate a batch of data objects that are instances of the same element. A batch of data objects that are instances of the same element is referred to herein as a sheet. For data objects in a sheet, the object-specific metadata used to validate any data object in the sheet MAY or MAY NOT be necessarily usable to validate another data object in the sheet. Described herein are techniques for quickly determining whether or not the object-specific metadata used to validate a data object can be used to validate another data object.

Using object-specific metadata used to validate a data object to validate another data object is referred to herein as "metadata reuse". The determination of whether the object-specific metadata used to validate a data object may be used to validate another data object is referred to herein as a "metadata reuse determination".

The techniques for validation and metadata reuse are described within the context of a certain model of a decentralized schema. To describe the techniques, it is important to first describe and highlight relevant aspects of the model. It should be understood, however, the techniques described herein are not limited to the particular model of a decentralized schema described herein.

Types of Elements

There are two main kinds of elements. A scalar element defines the content of a scalar node. A structured element lists other elements, which are referred to as child elements contained or listed by the structured element. The structured element is referred to as a parent element with respect to the child elements. The structured element defines rules that apply by default to child elements, or more specifically, instances of the child elements within an instance of the structured element.

According to an embodiment, structured elements are multiply typed. That is, a structured element's declaration may specify multiple types. According to an embodiment, a structured element has a default type, specifying a base element schema governing all element instances of any of the structured element's declared types. A type for a structured element other than the default type is referred to herein as a nondefault type.

Illustrative Data Object

FIG. 1 is a node tree graph that depicts data object R 101. Data object R 101 is described herein to illustrate aspects of a model of the decentralized schema.

Referring to FIG. 1, each node within data object R 101 is an instance of an element and has the name that element. Element names that are capitalized are names of structured elements and elements names that are not capitalized are names of scalar elements.

Data object R 101 is an instance of a structured element R. Element instance R contains three nodes: two nodes are element instances of element A and one node is an element instance of element B. If an element instance is an instance of a type other than the default type of the element, the type is designated within brackets. Node A is an element instance of the default type of element A. Node A[CM] is an element instance of the CM type of element A.

Element instance A contains a structured element instance C and a structured element instance D. Element instance C contains scalar element instances y, z, and o. Element instance D contains scalar element instances j, k, and l.

Element instance A[CM] contains two structured element instances C. The first (from the left) element instance C contains scalar element instances y, z, and p. The next element instance C contains scalar element instances x, y, and z.

Element instance B contains two structured element instances C. Each contains contain scalar element instances y and z.

Types may be mutable. A mutable type has one or more "type states" or "states." According to an embodiment, each state may define zero or more rules. Every type has a default state. A state for a type other than the default state is referred to herein as a nondefault state. Further details about elements and states are found in the Validation Application.

Paths and Type-Qualified Paths

For a given node, a path is the sequence of element names that comprise (1) each of the zero or more ancestor node names between the given node and a context node and (2) the element name of the given node, referred to herein as the terminal element. Paths are expressed using path expressions. According to an embodiment, a path expression is a sequence of ordered path element names separated by the delimiter "/".

For example, in data object R 101, assuming that the node A is the context node, the path expression C/y represents a path of the node y which is a descendant of node C.

An absolute path is a path where the context node is the root node. A root node is the one node in a node tree without a parent. In data object R 101, node R is the root node. In a path expression, an absolute path is expressed by denoting the root node as the context node, preceding the element name of the root node with an initial "/". For example, /R/A/C/o is an absolute path for node o.

A type-qualified path ("TQP") is a path in which each element in the path is qualified by at least one type. According to an embodiment, in a TQP expression for a TQP, the node's type is explicitly identified using a type identifier contained in brackets. The absence of such a bracket for a node name specifies the default type of the node's element. For example, the TQP expression /R/A[CM]/C/p identifies node p. Paths (and path expressions thereof) can identify a node in a data object. The node identified by a path is a node that has that path.

Because multiple nodes may have the same path, a path may identify more than one node. For example, the TQP expression /R/A[CM]/C/z identifies two nodes. A path expression is also used as a name for the node identified by that path expression.

Path expressions may be in any language, format, or standard. For example, paths may be expressed using XPath. It should be understood that embodiments are not limited to any particular language, format, or syntax for expressing or specifying paths.

Schema Rules Collection for Decentralized Schema

Under a decentralized schema, schema rules collection is based on the TQPs of structured element instances in the data object. According to an embodiment of the present invention, schema rule set collection is performed on an individual data object basis when the TQP of any structured element in the data object is resolvable. The rules are collected by traversing and visiting the nodes of the data object in a depth-first order traversal. Given a structured element and a data object having instances of the element, instances of the structured element that have the same TQP are subject to the same schema rule set while element instances that have a different TQP are not. For each distinct TQP in a data object, a set of metadata structures is generated: each set of data structures is particular to validating any structured element instance identified by the distinct TQP and holds metadata particular to the structured element instances. The set of metadata structures includes data structures for holding rules.

In data object R 101, the following are the distinct TQPs of structured element instances in data object R 101.

List TQP

/R
/R/A
/R/A/C
/R/A/D
/R/A[CM]
/R/A[CM]/C
/R/B
/R/B/C

Figure 2:
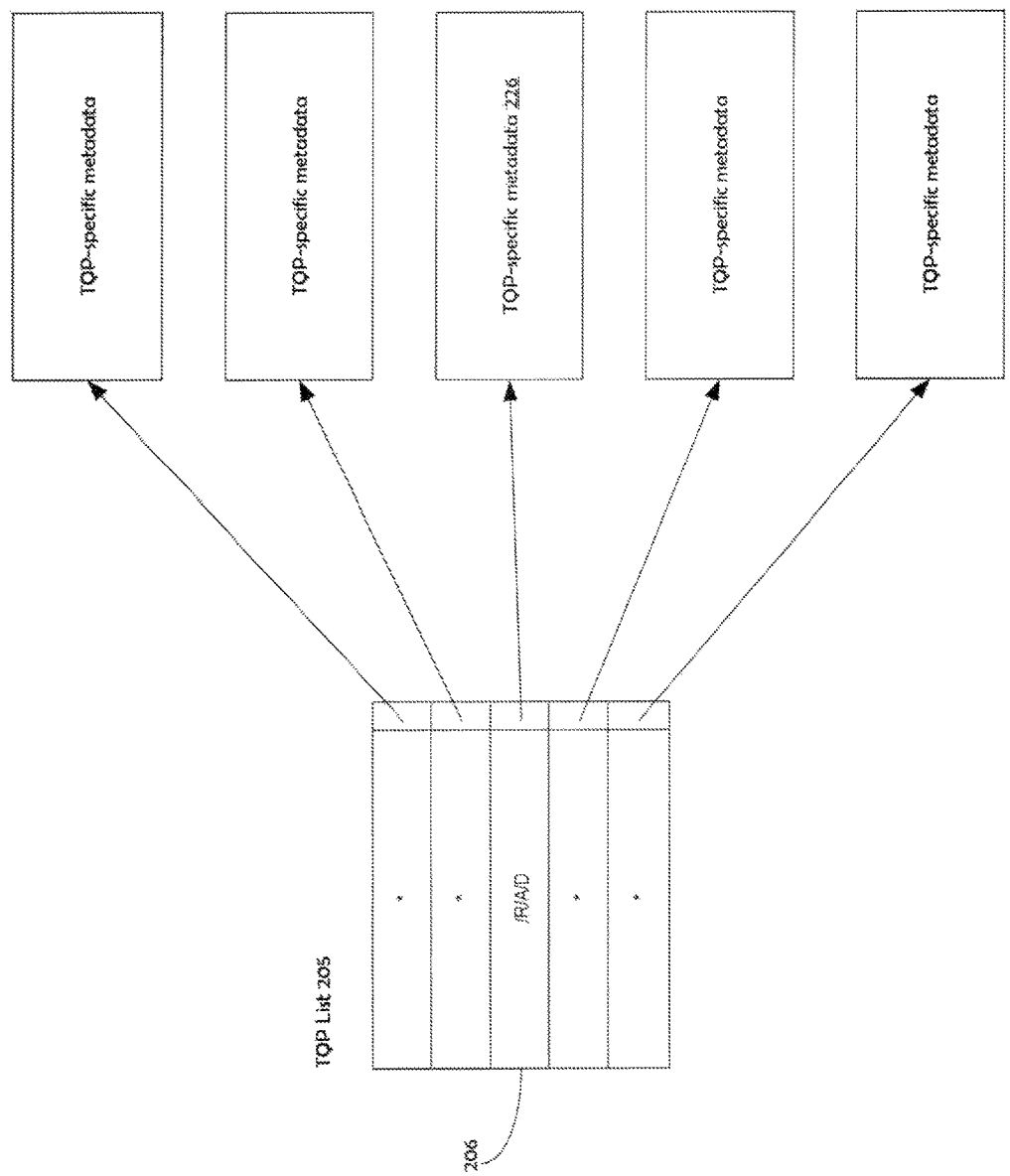
FIG. 2 is a diagram depicting object-specific metadata according to an embodiment of the present invention.

FIG. 2 depicts a set of in-memory data structures created for distinct TQPs of structured element instances in data object R 101, according to an embodiment of the present invention. Referring to FIG. 2, it depicts TQP List 205. TQP List 205 contains an entry for each distinct TQP within data object R 101. Each entry contains data describing details of the entry's respective TQP and a pointer to TQP-specific metadata structures. TQP-specific metadata is metadata (e.g. schema rules) that is specific to validating only structured element instances at that respective TQP. For example, entry 206 of TQP List 205 is the entry that corresponds to TQP /R/A/D. Entry 206 points to TQP-specific metadata 226, which contains metadata particular to validating instances of element D identified by the TQP /R/A/D.

Metadata Reuse

A metadata reuse determination may be made relatively quickly by comparing the TQPs present in data objects. According to an embodiment, "composite path signatures" of different data objects are compared to make a metadata reuse determination. If the composite path signatures match, then meta-data reuse is possible between the different data objects.

According to an embodiment, a composite path signature of a data object is a list of "path signatures", each path signature representing and being derived from a distinct TQP in the data object. According to an embodiment, for each path signature in a composite path signature, there is one and only one corresponding distinct TQP in the data object. For each distinct TQP in the data object, there is one and only one path signature in the composite path signature.

A path signature may be a path expression, or a value generated from a path expression. Within a domain of data objects (e.g. sheet), path signatures of different TQPs should not match, to allow determination of whether the TQPs are the same or not by comparison of the respective path signatures. For purposes of exposition, path signatures used to illustrate techniques herein are path expressions. However, an embodiment of the invention is not so limited.

Figure 3A:
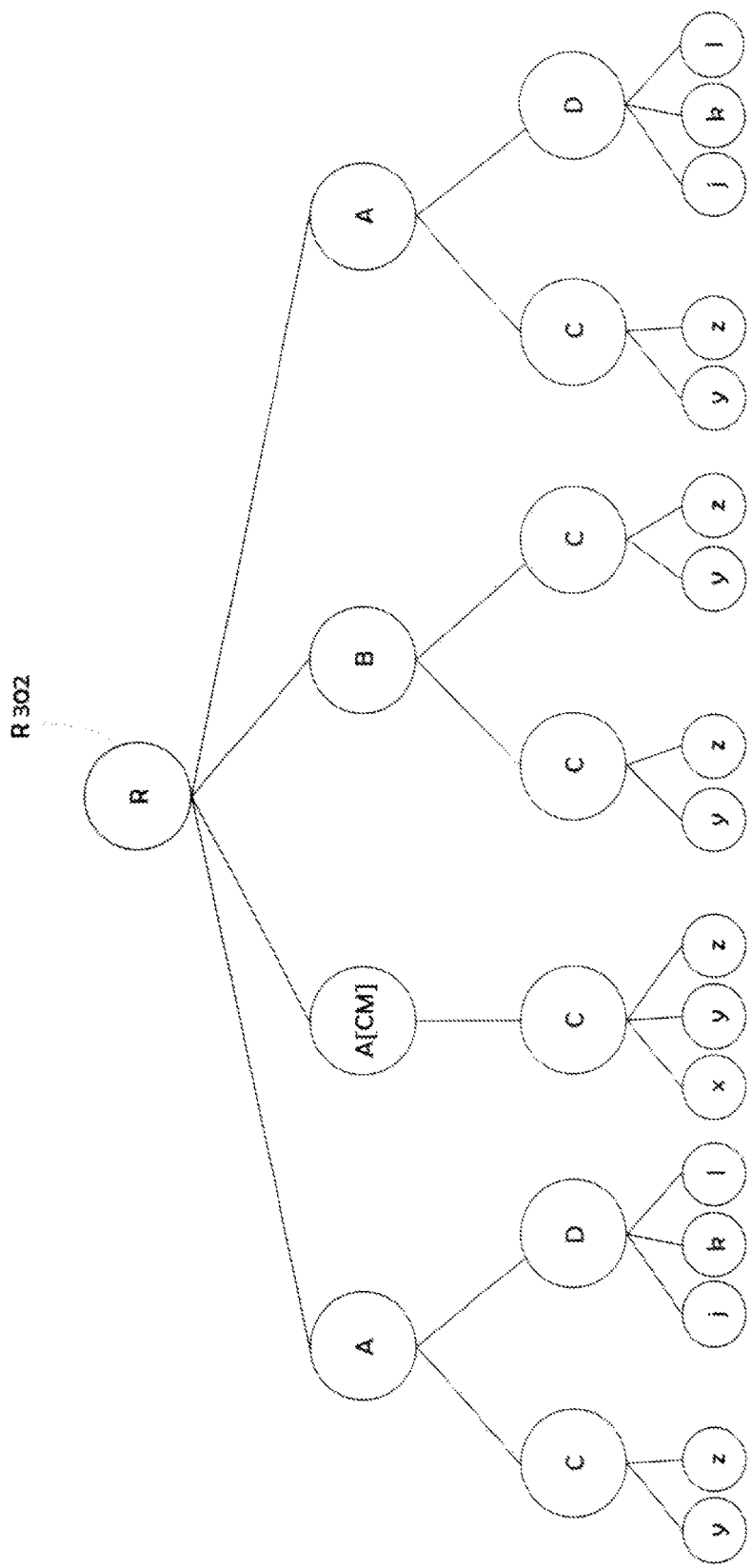
FIGS. 3A and 3B are diagrams depicting a data object containing instances of typed elements according to an embodiment of the present invention.
Figure 3B:
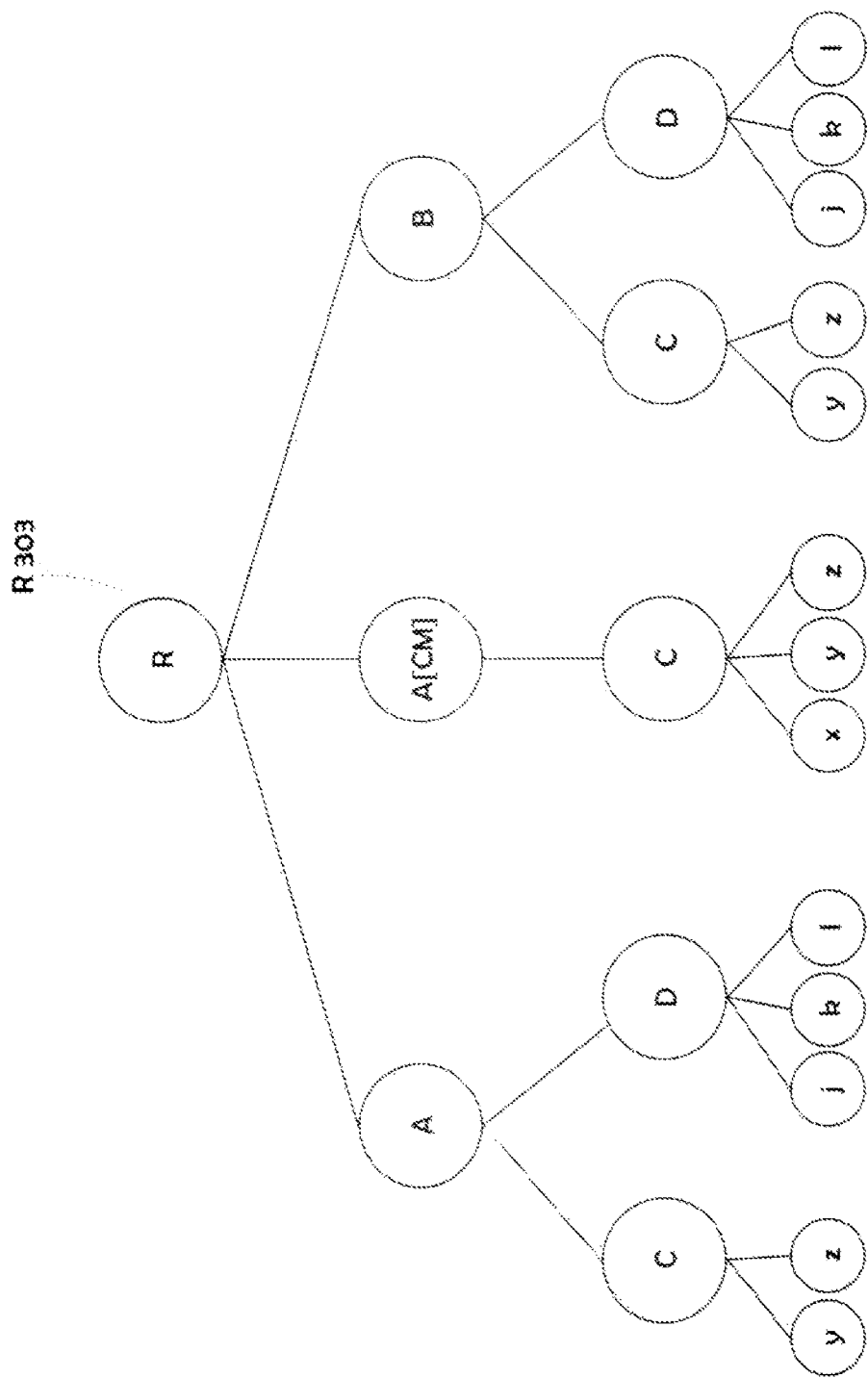
Figure 4:
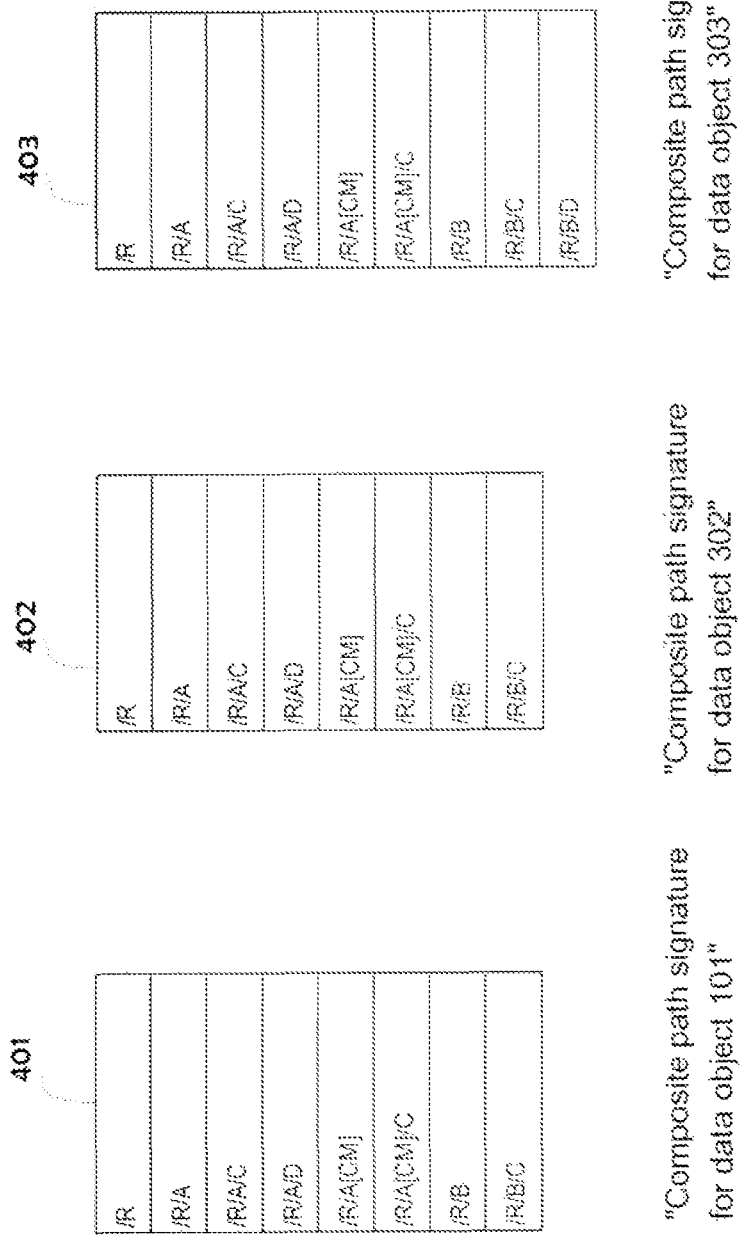
FIG. 4 is a diagram depicting composite path signatures according to an embodiment of the present invention.

To illustrate use of composite path signatures in metadata reuse determinations, additional data objects are depicted in FIG. 3 and composite path signatures are depicted in FIG. 4. FIG. 3A depicts data object R 302 and FIG. 3B depicts data object R 303. Both data object R 302 and data object R 303 are an instance of element R.

FIG. 4 depicts composite path signatures generated for data object R 101, data object R 302, and data object R 303. Composite path signature 401 is the composite path signature for data object R 101. Composite path signature 401 is comprised of the distinct TQPs listed above in List TQP of structured element instances in data object R 101.

Composite path signature 402 is identical to composite path signature 401. These composite signatures are identical even though data object R 302 has a different structure than data object R 101. Data object R 302 contains an additional node /R/A. However, because the composite path signature 402 and composite path signature 401 match, metadata reuse is available between data object R 101 and data object R 302.

Composite path signature 403 does not match either composite path signature 401 or composite path signature 402. Unlike composite path signature 401 or composite path signature 402, composite path signature 403 contains node /R/B/D. Metadata reuse is not available between data object R 303 and data object R 101 or data object R 302.

Metadate Reuse Determination

Figure 5:
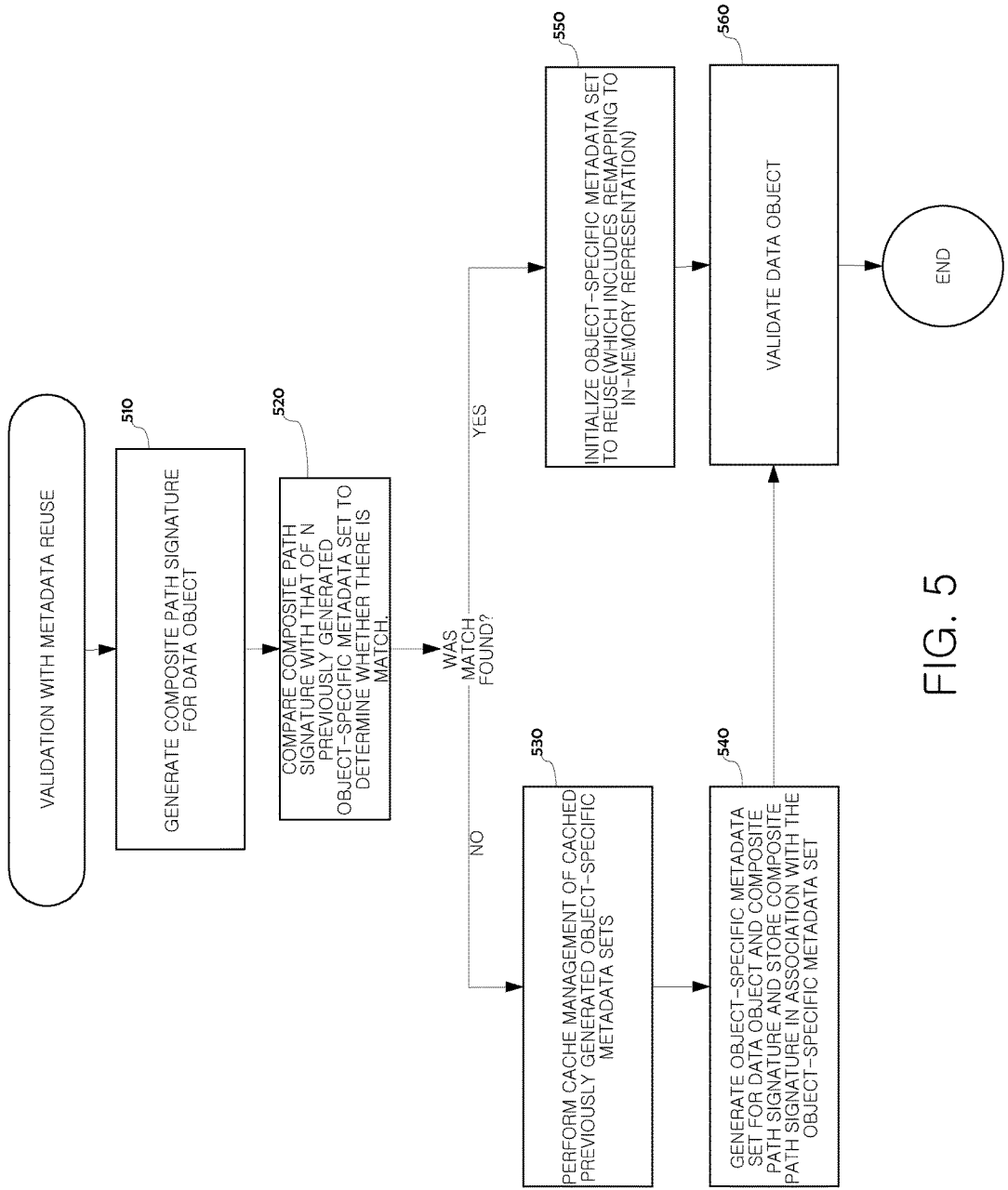
FIG. 5 is a flowchart depicting a procedure for validating data objects using metadata reuse according to an embodiment of the present invention.

FIG. 5 is a flow chart describing a validation procedure employing metadata reuse, using composite path signatures to make a metadata reuse determination. The procedure is performed as part of validating a set of data objects. Validating an initial subset of data objects generates N different sets of object-specific metadata, each set of which is associated with a different composite path signature. When subsequently validating another data object, a composite path signature is generated for the data object and compared with the composite path signatures of the N different sets of object-specific metadata. If a match is found, then the object-specific metadata of the matching composite path signature is reused for the data object.

For purposes of exposition, the validation procedure is illustrated using data object R 101, data object R 302, and data object R 303. In the illustration, data object R 302 is being validated and validation has been performed on data object R 101 and data object R 303 and other data objects. The N sets of object-specific metadata are stored in a cache, the N sets of object-specific metadata including object-specific metadata generated for data object R 101 and a different set of object-specific metadata data generated for object R 303. Composite path signature 401 is stored in association with the object-specific metadata generated for data object R 101 and composite path signature 403 is stored in association with the object-specific metadata generated for data object R 303, respectively.

Referring to FIG. 5, composite path signature 402 is generated for data object R 302. (510) Composite path signature 402 is generated by a depth-first order traversal of an in-memory representation of data object R 302. The composite path signature is compared with the composite path signatures of the cached object-specific metadata. (520) During the comparison, it is determined that composite path signature 402 does not match composite path signature 403 but does match composite path signature 401. Because a match is found between composite path signature 402 and composite path signature 401, the cached object-specific metadata of data object R 101 is reusable to validate data object R 302.

The object-specific metadata to reuse is initialized. (550) Some data structures in the object-specific metadata need to be initialized before metadata reuse. Such initializing includes a remapping, as shall be described in further detail later. The initialization requires much less computing power than generating object-specific metadata from scratch.

Finally, data object R 302 is validated using the initialized object-specific metadata. (560)

If a match has not been found, then cache management is performed on the cached sets of object-specific metadata (530). If N sets of object-specific metadata are cached, then one of the sets is removed according to a cache management policy.

Next, object-specific metadata is generated for the data object being validated. A composite path signature is generated for the object-specific metadata and stored in association with the object-specific metadata. (540) The object-specific metadata generated is used to validate the data object (560) The object-specific metadata is cached for possible reuse to validate another data object.

According to an embodiment, composite path signatures are each stored as an ordered list ordered according to the path signatures of the composite path signature. Such ordering allows quicker determinations of whether composite path signatures match. Optionally, all TQPs of all structured elements are added to a list of TQPs. After collecting all TQPs in the list, the list is ordered and duplicates are eliminated. Ordering facilitates detection of duplicates.

In a "1-step" approach to metadata reuse, only one set of object-specific metadata is cached. Once object-specific metadata is generated and/or used for validating a data object, if the object-specific metadata is not found to be reusable for subsequent validation of another data object, the object-specific metadata is discarded.

Finally, "metadata reuse criteria" is criteria used to determine whether object-specific metadata may be reused. A data object's composite path signature matching the composite path signature of a set of object-specific metadata is an example of metadata reuse criteria. In an embodiment of the present invention, metadata reuse criteria may include other criteria.

Initialization of Object Metadata for Reuse

According to an embodiment, to validate a data object, an in-memory representation is generated for the data object. The in-memory representation has element instance data structures, each of which is an in-memory representation of an element instance in a data object. The element instance data structures are linked by memory pointers in a way that reflects the hierarchical relationships of the elements instances within the data object represented. Hence, the linked element instance data structures form a node tree, each element instance data structure being a node in the node tree, or, in other words, a node in the in-memory representation. The in-memory representation of the data object is referred to herein as the in-memory data object and the nodes of in-memory data object are referred to herein as in-memory nodes.

According to an embodiment, each node in an in-memory data object, like other in-memory data structures, is located at a memory location identified by a memory pointer, a value referred to herein as an in-memory node pointer. Similarly, other data structures in a set of object-specific metadata also have memory locations pointed to by a memory pointer. For example, each entry in a TQP list 205 is pointed to by a pointer referred to herein as a TQP pointer. Each TQP-specific metadata structure is also pointed to by a memory pointer. As mentioned previously, each entry 206 in TQP list 205 stores a memory pointer that points to a specific TQP-specific metadata structure.

As shall be explained in greater detail, the in-memory node pointers of an in-memory data object are used to map nodes to respective sets of TQP-specific metadata. Specifically, an in-memory node pointer is used to map an in-memory node to the TQP-specific metadata structure needed to validate the in-memory node. Thus, even though object-specific metadata may be reused to validate another data object, the other data object is not the same, its in-memory data object is not the same, and the in-memory node pointers are not the same. Thus, to reuse object-specific metadata for another in-memory data object, the other in-memory data object must be mapped to the appropriate set of TQP-specific metadata structure. This operation is referred to herein as remapping.

Figure 6A:
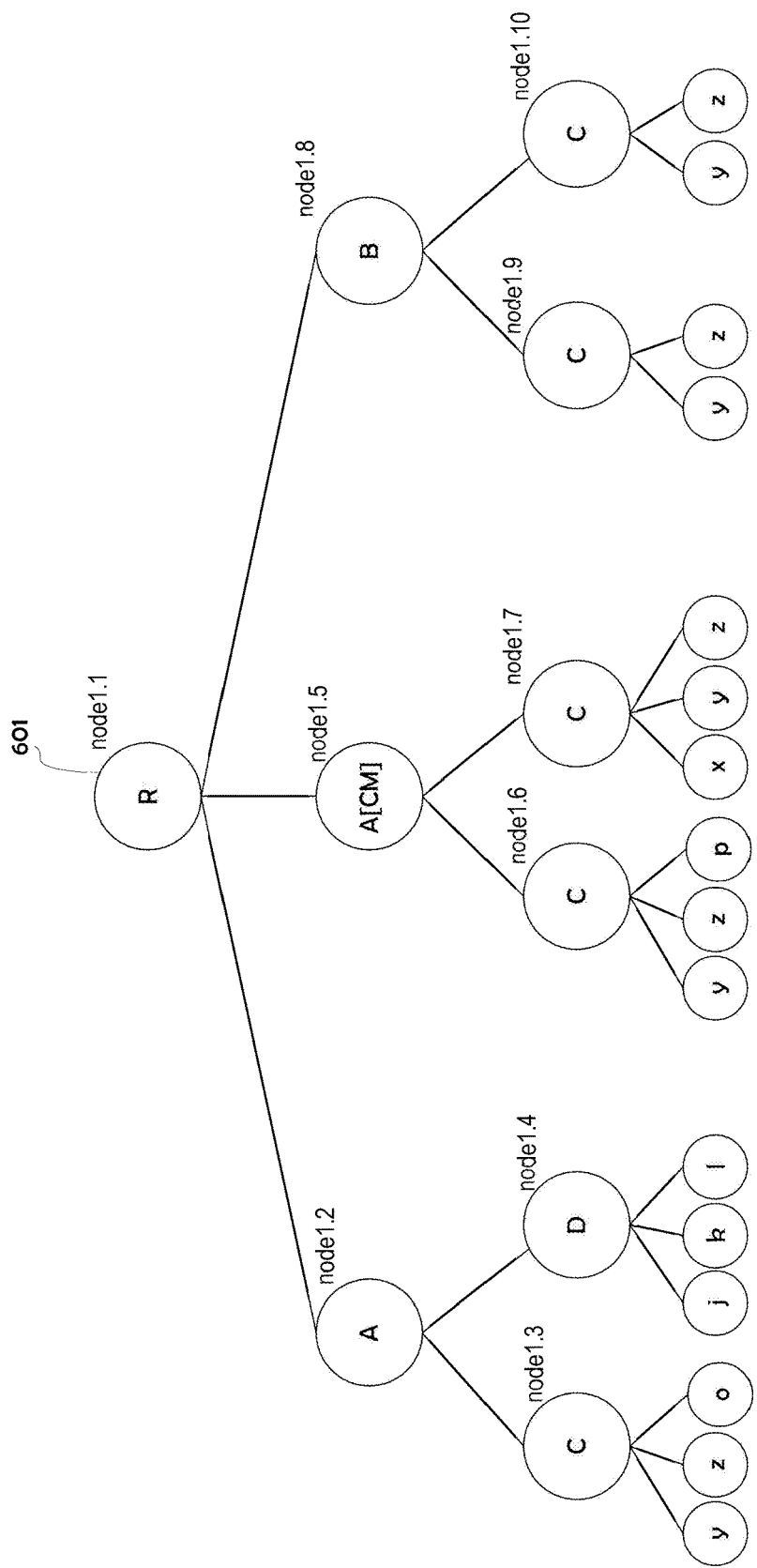
FIGS. 6A and 6B are diagrams depicting an in-memory representation of a data object according to an embodiment of the present invention.

To illustrate remapping, in-memory data objects and data structures of object-specific metadata used for mapping are provided. Referring to FIG. 6A, it depicts in-memory data object 601, an in-memory data object representing data object R 101. An in-memory node of in-memory data object 601 is labeled by the element name of the element instance the in-memory node represents. In addition, each node is annotated with the node's respective in-memory node pointer. For example, the pointer for node R is node1.1; the pointer for node A[CM] is node1.5.

Figure 6B:
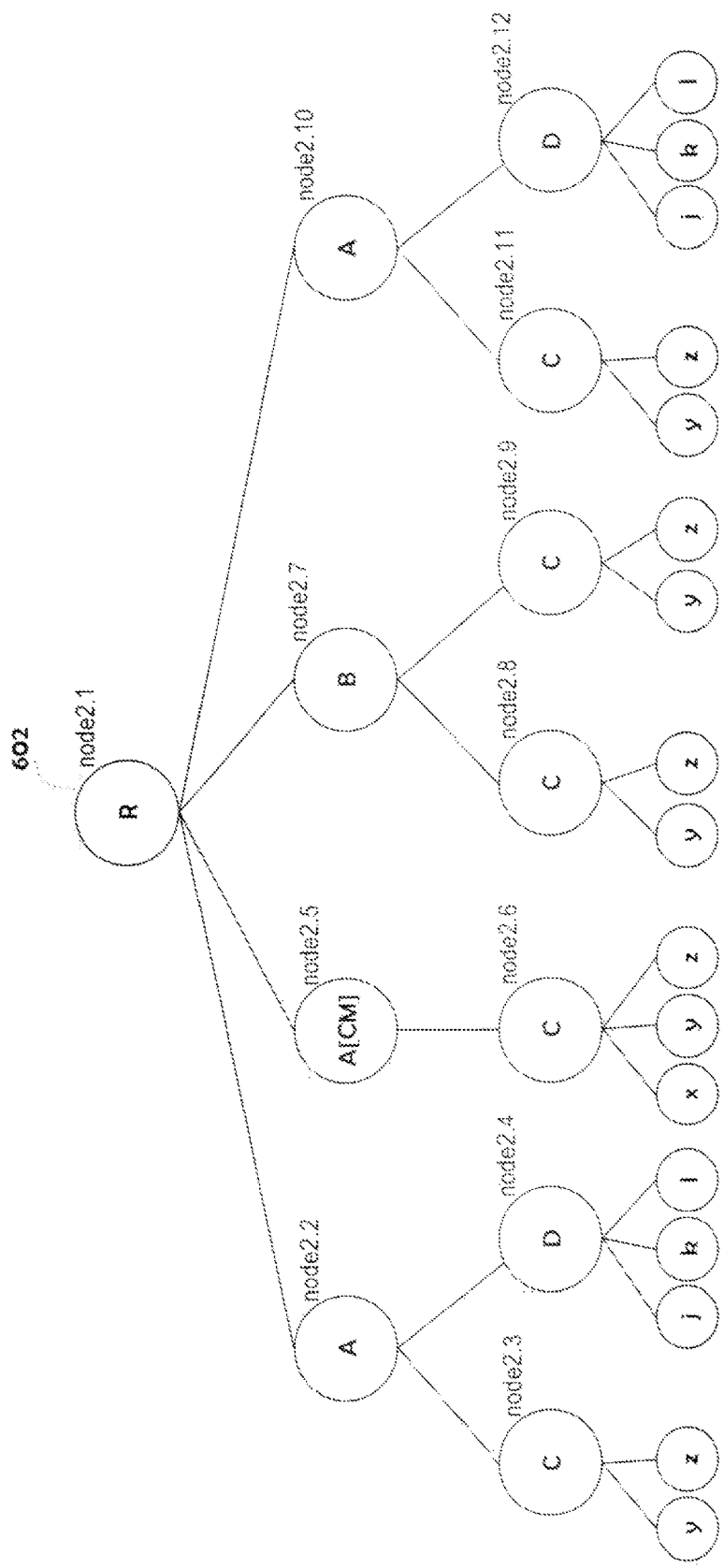

FIG. 6B depicts in-memory data object 602, an in-memory representation of data object R 302. In-memory data object 602 is annotated and labeled in the same manner as in-memory data object 601 in FIG. 6A.

FIG. 7 shows object-specific metadata structures involved in mapping in-memory nodes to TQP-specific metadata structures. Referring to FIG. 7, it depicts Node-TQP Table 702. Node-TQP Table 702 maps an in-memory node pointer to its respective path signature. TQP Hash Table 703 maps a path signature to a TQP pointer. TQP Hash Table 703 is a hash table indexed by path signature. The combination of Node-TQP Table 702 and TQP Hash Table 703 maps an in-memory node by its in-memory node pointer to the respective TQP List 205 entry. For example, for node B of in-memory data object 601, its in-memory node pointer node 1.8 is mapped by Node-TQP Table 702 to path signature /R/B, which is mapped by TQP Hash Table 703 to TQP pointer tqp7, the TQP entry for node B. As mentioned before, the TQP entry points to other TQP-specific metadata structures needed to validate the in-memory node.

To reuse object-specific metadata of in-memory data object 601, a Node-TQP table is regenerated for the other new data object to validate. TQP HASH Table 703, TQP List 205, and the pointed to TQP-specific metadata structures do not have to be regenerated.

Referring to FIG. 8, it depicts Node-TQP Table 802 and TQP Hash Table 703. To validate data object 302 by reusing the same object-specific metadata generated for data object R 101, Node-TQP Table 802 is generated while TQP Hash Table 703 and the respective TQP-specific metadata structures are retained. Node-TQP Table 802 maps an in-memory node pointer to its respective path signature in TQP Hash Table 703. The combination of Node-TQP Table 802 and TQP Hash Table 703 maps in-memory nodes to the respective TQP List 205 entries. For example, for node B of in-memory data object 602, its in-memory node pointer node 2.7 is mapped by Node-TQP Table 802 to path signature /R/B, which is mapped by TQP Hash Table 703 to tqp7, the TQP entry for node B.

Hardware Overview

Claimed embodiments of techniques and mechanisms described herein are implemented on computer systems, and are preferably used in environments to validate a voluminous number of complex data objects. As a practical matter, the use of a computer system in claimed embodiments is required. The techniques should not be construed in any way as being amendable to being performed mentally or manually. Example computer systems that may be used to implement an embodiment include, but are not limited to, the computer systems described in this section.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
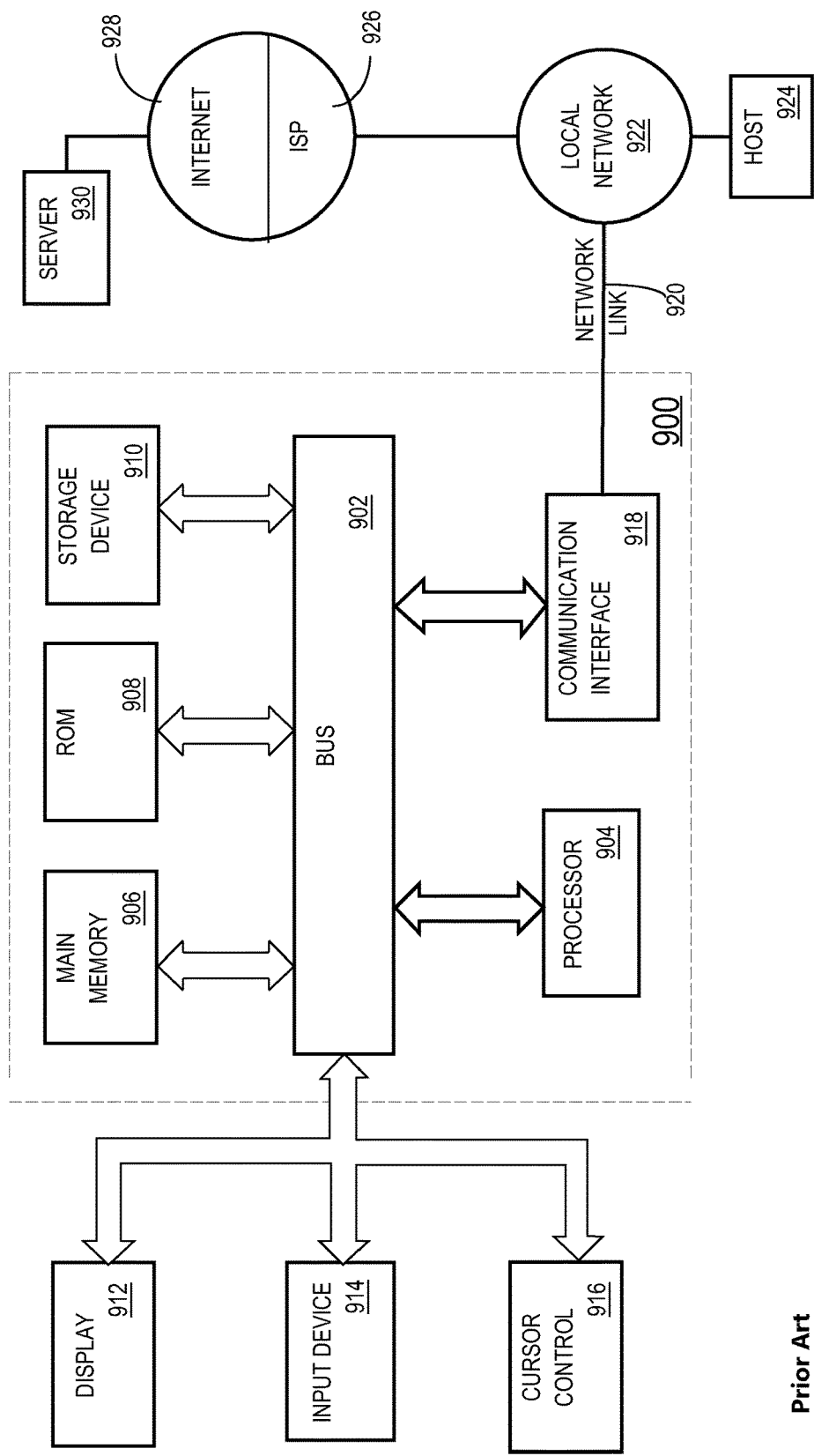
FIG. 9 is a diagram depicting a computer system that may be used in an embodiment of the present invention.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, said method comprising steps of:
   generating metadata that is used to validate a first data object;
   determining whether said metadata satisfies one or more reuse criteria for reusing said metadata to validate a second data object;
   wherein said reuse criteria includes at least that a first set of distinct paths in said first data object match a second set of distinct paths in said second data object;
   in response to determining that said metadata satisfies said one or more reuse criteria, using said metadata to validate said second data object;
   wherein the method is performed by one or more computing devices.

2. The method of claim 1, further including modifying said metadata before reusing said metadata to validate said second data object.

3. The method of claim 1,
   wherein the first data object is a first instance of a structured element containing second descendant structured element instances;
   wherein the second data object is a second instance of said structured element containing second descendant structured element instances;
   wherein each path in the first set of distinct paths is a path of a structured element instance in said first data object; and
   wherein each path in the second set of distinct paths is a path of a structured element instance in said second data object.

4. The method of claim 3, wherein:
   each structured element of which there is an instance in said first data object or said second data object has a type; and
   each path in said first set of distinct paths and said second set of distinct paths is a type qualified path.

5. A method, comprising:
   generating N sets of metadata to validate data objects, each set of the N sets of metadata being generated to validate a respective data object of said data objects;
   wherein each set of the N sets of metadata is associated with a respective composite path signature of a plurality of composite path signatures;
   wherein each composite path signature of said plurality of composite path signatures comprises a plurality of path signatures, each path signature of said plurality of path signatures representing a distinct path of one or more structured element instances in the respective data object of the set of the N sets of metadata that is associated with said each composite path signature;
   generating a first composite path signature for a first data object, said first composite path signature comprising a first plurality of path signatures, each path signature of said first plurality of path signatures representing a distinct path of one or more structured element instances in the first data object;
   determining whether said first composite path signature matches a particular composite path signature of said plurality of composite path signatures; and
   in response to determining that the particular composite path signature matches the first composite path signature, using a particular set of the N sets of metadata that is associated with said particular composite path signature to validate the first data object; and wherein the method is performed by one or more computing devices.

6. The method of claim 5, wherein the N sets of metadata are stored in a cache, the method further comprising:
generating a second composite path signature for a second data object, said second composite path signature comprising a second plurality of path signatures, each path signature of said second plurality of path signatures representing a distinct path of one or more structured element instances in the second data object;
determining whether said second composite path signature matches any composite path signature of the plurality of composite path signatures of said data objects; and
in response to determining that no composite path signature of the plurality of composite path signatures match the second composite path signature:
removing a set of metadata of the N sets of metadata from the cache; and
generating another set of metadata for validating said second data object.

7. The method of claim 5, wherein generating a first composite path signature for a first data object comprises:
generating a list of paths of structured element instances visited during a depth-first traversal of said first data object;
ordering the list of paths; and
after ordering the list of paths, eliminating duplicate paths from the list.

8. The method of claim 5, wherein said particular set of the N sets of metadata is modified before using said particular set of the N sets of metadata to validate said first data object.

9. The method of claim 8, further including remapping an in-memory representation of said first data object to structures within said particular set of the N sets of metadata.

10. The method of claim 9:
wherein a first mapping maps first path signatures to particular sets of metadata structures of said particular set of the N sets of metadata, each first path signature of said first path signatures being mapped to a set of metadata structures used to validate any element instance that is identified by a path represented by said each first path signature;
wherein said in-memory representation comprises in-memory nodes that each represent a structured element instance within said first data object; and
wherein remapping includes generating a second mapping that maps pointers to said in-memory nodes to the first path signatures mapped by said first mapping.

11. A non-transitory computer-readable medium storing instructions which, when executed by one or more processors, cause:
generating metadata that is used to validate a first data object;
determining whether said metadata satisfies one or more reuse criteria for reusing said metadata to validate a second data object;
wherein said reuse criteria includes at least that a first set of distinct paths in said first data object match a second set of distinct paths in said second data object; and
in response to determining that said metadata satisfies said one or more reuse criteria, using said metadata to validate said second data object.

12. The non-transitory computer-readable medium of claim 11, wherein the instructions include instructions, that when executed by said one or more processors, cause modifying said metadata before reusing said metadata to validate said second data object.

13. The non-transitory computer-readable medium of claim 11,
wherein the first data object is a first instance of a structured element containing second descendant structured element instances;
wherein the second data object is a second instance of said structured element containing second descendant structured element instances;
wherein each path in the first set of distinct paths is a path of a structured element instance in said first data object; and
wherein each path in the second set of distinct paths is a path of a structured element instance in said second data object.

14. The non-transitory computer-readable medium of claim 13, wherein:
each structured element of which there is an instance in said first data object or said second data object has a type; and
each path in said first set of distinct paths and said second set of distinct paths is a type qualified path.

15. A non-transitory computer-readable medium storing instructions, which when executed by one or more processors, cause:
generating N sets of metadata to validate data objects, each set of the N sets of metadata being generated to validate a respective data object of said data objects;
wherein each set of the N sets of metadata is associated with a respective composite path signature of a plurality of composite path signatures;
wherein each composite path signature of said plurality of composite path signatures comprises a plurality of path signatures, each path signature of said plurality of path signatures representing a distinct path of one or more structured element instances in the respective data object of the set of the N sets of metadata that is associated with said each composite path signature;
generating a first composite path signature for a first data object, said first composite path signature comprising a first plurality of path signatures, each path signature of said first plurality of path signatures representing a distinct path of one or more structured element instances in the first data object;
determining whether said first composite path signature matches a particular composite path signature of said plurality of composite path signatures; and
in response to determining that the particular composite path signature matches the first composite path signature, using a particular set of the N sets of metadata that is associated with said particular composite path signature to validate the first data object.

16. The non-transitory computer-readable medium of claim 15, wherein the N sets of metadata are stored in a cache, wherein the instructions include instructions, that when executed by said one or more processors, cause:
generating a second composite path signature for a second data object, said second composite path signature comprising a second plurality of path signatures, each path signature of said second plurality of path signatures representing a distinct path of one or more structured element instances in the second data object;

determining whether said second composite path signature matches any composite path signature of the plurality of composite path signatures of said data objects; and in response to determining that no composite path signature of the plurality of composite path signatures match the second composite path signature:

removing a set of metadata of the N sets of metadata from the cache; and generating another set of metadata for validating said second data object.

17. The non-transitory computer-readable medium of claim 15, wherein generating a first composite path signature for a first data object comprises:

generating a list of paths of structured element instances visited during a depth-first traversal of said first data object;

ordering the list of paths; and after ordering the list of paths, eliminating duplicate paths from the list.

18. The non-transitory computer-readable medium of claim 15, wherein said particular set of the N sets of metadata is modified before using said particular set of the N sets of metadata to validate said first data object.

19. The non-transitory computer-readable medium of claim 15, wherein the instructions include instructions, that when executed by said one or more processors, cause remapping an in-memory representation of said first data object to structures within said particular set of the N sets of metadata.

20. The non-transitory computer-readable medium of claim 19:

wherein a first mapping maps first path signatures to particular sets of metadata structures of said particular set of the N sets of metadata, each first path signature of said first path signatures being mapped to a set of metadata structures used to validate any element instance that is identified by a path represented by said each first path signature;

wherein said in-memory representation comprises in-memory nodes that each represent a structured element instance within said first data object; and wherein remapping includes generating a second mapping that maps pointers to said in-memory nodes to the first path signatures mapped by said first mapping.

\* \* \* \* \*